No. 630,158. Patented Aug. 1, 1899.
G. YOUNGS.
SHOCK BINDER.
(Application filed Oct. 21, 1898.)
(No Model.)
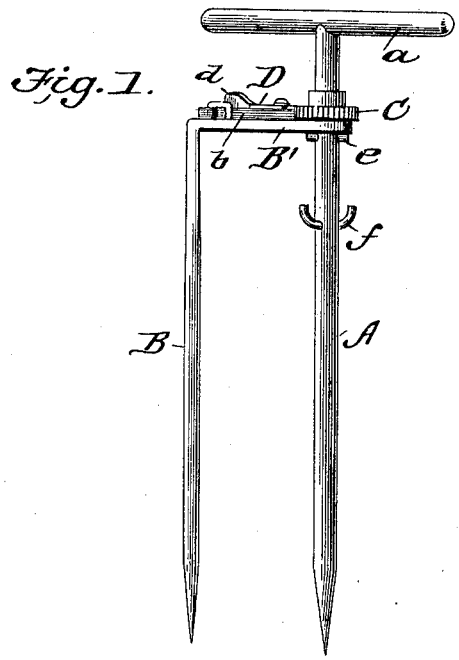
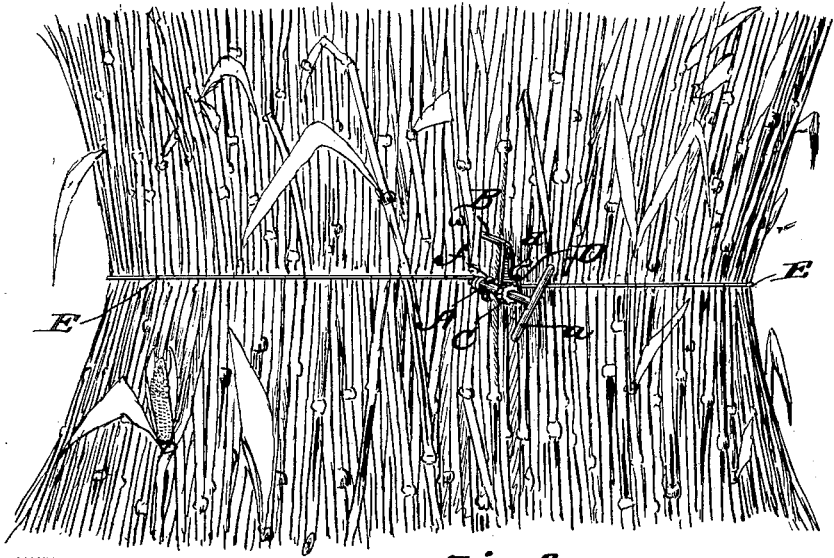
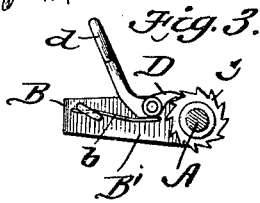
WITNESSES:
M. S. Bloudel.
Edw. W. Byrn.
INVENTOR
George Youngs.
BY Munn & Co.
ATTORNEYS.

UNITED STATES PATENT OFFICE.

GEORGE YOUNGS, OF FAYETTEVILLE, MISSOURI.

SHOCK-BINDER.

SPECIFICATION forming part of Letters Patent No. 630,158, dated August 1, 1899.

Application filed October 21, 1898. Serial No. 694,176. (No model.)

*To all whom it may concern:*

Be it known that I, GEORGE YOUNGS, of Fayetteville, in the county of Johnson and State of Missouri, have invented a new and useful Improvement in Shock-Binders, of which the following is a specification.

My invention is in the nature of an improvement in shock-binders or devices for compressing a shock of cornstalks or any other kind of grain or forage that is stacked up into shocks in the field, to prevent the same from being blown about by the wind, or for binding into bundles fodder, brush, or other material.

My invention is an improvement upon that form of shock-binder in which a rotary shaft with which a ratchet-wheel and pawl and a suitable handle for rotating said shaft is designed to be connected to the opposite ends of a rope which is first passed around the shock. Then when the rotary shaft is turned the two ends of the rope are wound upon the shaft after the manner of a windlass, and after the shock has been sufficiently compressed or constricted thereby the permanent binding-cord is placed around the shock and tied. My invention is designed to provide a simple and better device for this purpose, and to that end it consists in the peculiar construction and arrangement of parts which I will now proceed to describe with reference to the drawings, in which—

Figure 1 is a side view of the device. Fig. 2 is a perspective view of the same applied to a shock of cornstalks for the purpose of constricting them preparatory to binding, and Fig. 3 a sectional end view.

A is the rotary shaft, which is pointed at one end and provided with a T-handle $a$ at the other.

B is an anchorage-prong, which is arranged parallel with and beside the shaft A and of nearly the same length. It also is pointed at one end, and at the other it is bent sharply at right angles, as at B', and this end is perforated and made to embrace the windlass-shaft A with a swiveling connection. On the winding-shaft A there is rigidly fixed a ratchet-wheel C, and with the teeth of this ratchet-wheel there engages the end of a pawl D, which is pivoted upon the right-angular portion B' of the prong and is held into engagement with the ratchet-wheel by a spring $b$. This pawl is provided with a thumb-piece $d$, by which its tooth may be lifted out of engagement with the ratchet-wheel when desired. To prevent the prong end B' from sliding along the winding-shaft, its perforated end lies between the ratchet-wheel and a cross-pin $e$ in the winding-shaft. The winding-shaft is also provided with two bent pins, hooks, or eyes, as shown at $f$, to which the ends of the constricting rope or band E are attached, so as to be wound thereon when the shock is to be compressed. These anchorage connections for the rope are located inside the ratchet-wheel and bent arm or between them and the pointed end of the shaft or prong A.

In making use of my invention it is applied as shown in Fig. 2. The winding-shaft A and prong B are both forcibly stuck into the shock or bundle with the prong B in a vertical plane in relation to shaft A or in a plane at right angles to the lay of the rope E, so that the latter will not bind against the prong B in winding on the shaft A. The rope or band E is then passed around the shock or bundle, and its ends are attached to the curved pins $f$. The T-handle is then rotated, and as the shaft A turns it gradually but strongly winds up on the same the two ends of the rope until the shock has been compressed or constricted to sufficiently small dimensions, and then the permanent tie-cord is placed around the shock or bundle and tied. After this a slight turn on the T-handle and a pressure on the thumb-piece of the pawl will release the rope E, and the device may then be taken to another shock or bundle.

The advantage of my particular construction is that the parallel anchorage-prong gives for the winding-shaft a bearing outside the shock, as well as the one in the shock, and holds it very much steadier while being operated. Furthermore, the bend B' of the prong furnishes a simple and convenient base upon which to pivot the pawl, which brings it in proper relation to the ratchet-wheel, and also to the hand of the operator, in a simple, cheap, and practical way.

Having thus described my invention, what I claim as new, and desire to secure by Letters Patent, is—

1. In a shock-binder, two parallel prongs loosely connected together, one of them arranged to rotate in the bent extension of the other and provided with anchorage connections located on the rotary prong inside of said bent extension and having also outside of said bent extension rigid ratchet-wheel C, and a turning handle a; and the other prong having its bent end perforated to form a bearing for the first-named prong and having a pawl mounted on said bent end and engaging with the ratchet-wheel to lock the two prongs rigidly together substantially as and for the purpose described.

2. In a shock-binder, two parallel prongs loosely connected together, and one of them arranged to rotate in the bent extension of the other and provided with anchorage-hooks f inside the bent extension, a rigid ratchet-wheel C, and a turning handle a; and the other prong having its bent end perforated to form a bearing for the first-named prong, and having a pawl mounted on said bent end and engaging with the ratchet-wheel to lock the two prongs rigidly together, and a rope or binder having its two ends connected to the anchorage-hooks ff substantially as and for the purpose described.

GEORGE YOUNGS.

Witnesses:
JOSEPH M. GUNN,
HIRAM F. CAMPBELL.